United States Patent Office 3,396,938
Patented Aug. 13, 1968

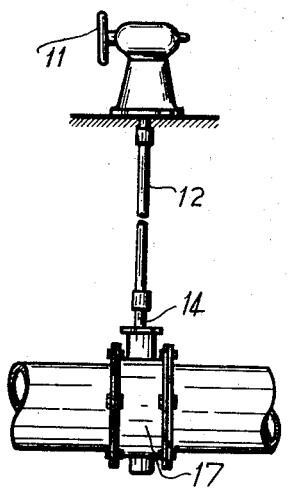
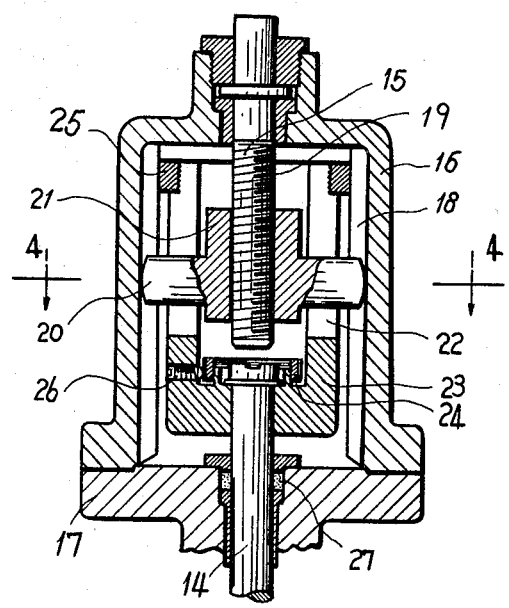
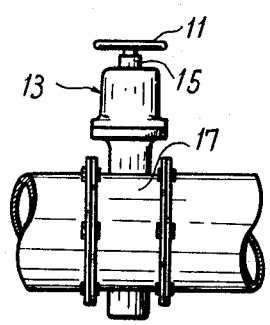
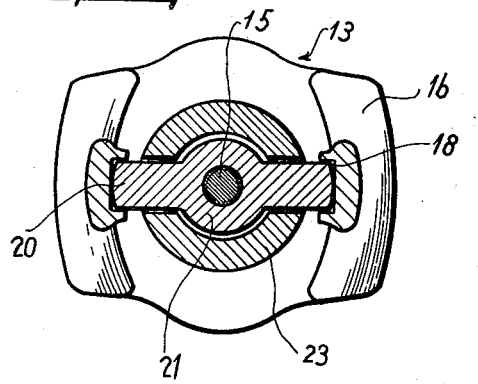
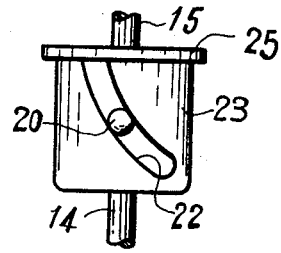

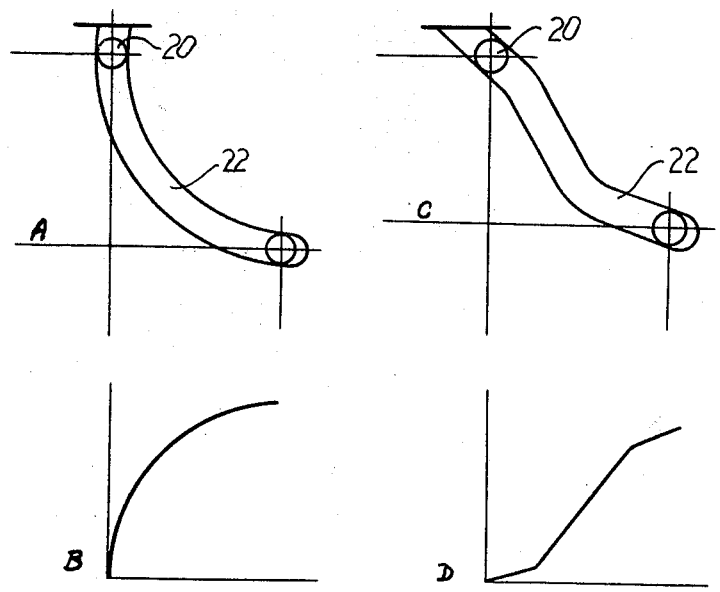
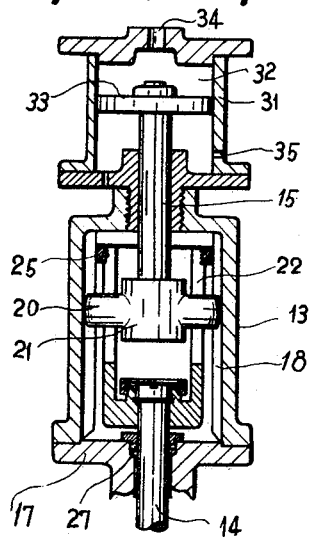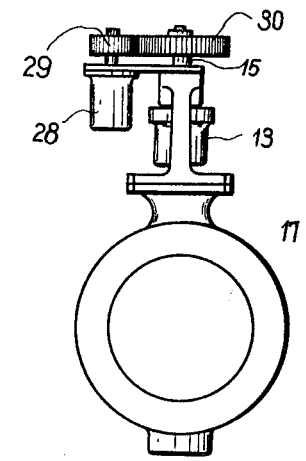

3,396,938
VALVE ACTUATING DEVICE
Teruhiko Matsui, Kawasaki, Japan, assignor to Maenaka Valve Works Co., Ltd., Tokyo, Japan
Filed Dec. 8, 1965, Ser. No. 512,341
Claims priority, application Japan, Aug. 7, 1965, 40/47,842
2 Claims. (Cl. 251—229)

ABSTRACT OF THE DISCLOSURE

A device for opening or closing a valve or for locking the valve in any position between the open and closed positions, the device includes a handle to turn the valve, and a slotted bushing, pins on the handle member being confined to movement in the slots to effect opening or closing of the valve with very little effort.

---

The present invention relates to a valve "ON-OFF" control device adapted to be utilized with a valve such as a butterfly valve or a cock which is opened and closed by rotational movement.

In the prior art, a butterfly valve is locked and reduction-driven by means of a combination of a worm and a worm wheel or by means of a combination of a screw and a lever with a reduction gear so that valve control operation can not be made along the axis of the valve stem. Therefore, opening and closing operation of the valve is conducted by means of a handle provided at the lateral side of the valve. Under the circumstances, when a valve is installed in a very narrow space or when a remote control means or device is provided on the vertical axis of a valve being installed, accurate control of the valve is difficult and the prior art device has the following drawbacks.

When a valve is installed in a very small space and is intended to be remote-controlled, a series of connecting levers must be provided between the valve stem and the remote controller so that the valve may be opened and closed as desired. However, when the valve is closed, the connecting rod connecting the valve and the remote control device is subjected to torsion, which is caused by the application of force to the control device. Thus, once the control device stops functioning, such torsion is relieved by means of resistances of the valve seat portions and the valve packing portion, so that air-tight force of the valve seat portion is caused to be reduced, thus resulting in leakage of the valve seat portion, which is one of the most important drawbacks of such a valve.

Bearing in mind the aforementioned drawbacks, the primary object of this invention is to provide a valve control device in which the above described drawbacks are completely remedied and further by converting rotational movement of a connecting rod into rotational movement of a valve stem between a connecting rod connected to a driving device and a valve stem by means of a reduction gear and a clock mechanism, opening and closing force (turning effort) of a driving shaft can be reduced so that locking at a stopped position is positively ensured and also the operation on the vertical axial line of the valve stem can be made possible.

Another object of this invention is to facilitate the opening and closing operation of a valve in an extremely light manner because of threading in of a handle shaft with an internally threaded bush and because of fitting of pins of said bush into guide slots of a rotor so that rotation of a handle shaft may be reduced and then transmitted to the valve stem.

Still another object of this invention resides in that by suitably forming said guide slots in case of threading of said handle shaft into the internally threaded bush and the fitting into rotor guide slots of pins of the bush so that the degree of rotational movement of the pins may be made to coincide with a desired opening and closing speed of the valve.

The present invention will be clearly understood by the following description with reference to the accompanying drawings in which a preferred embodiment of this invention is illustrated.

In the accompanying drawings, FIG. 1 is a front view illustrating a conventional valve actuating device; FIG. 2 is a front view of a manual valve control device according to the present invention; FIG. 3 is an enlarged longitudinal front view showing the essential components of the device according to the present invention; FIG. 4 is a sectional view taken along 4—4 of FIG. 3; FIG. 5 is a front view illustrating a rotor according to this invention; FIGS. 6(A), (B), (C) and (D) respectively show relationships between the lift of an internally threaded bush versus the angular rotation of the valve body; FIG. 7 is a side view of another embodiment of a mechanical control system according to the present invention; and FIG. 8 is a longitudinal sectional view of another embodiment of this invention, in which the actuation of the piston drives the valve stem. As shown in the drawings, a handle 11 is adapted to impart driving force to a connecting rod 12. A converting mechanism 13 is adapted to reduce the rotational driving force of the handle 11 and to impart the force to a valve stem 14. This mechanism is interposed between the connecting rod 12 and the valve stem 14 of FIG. 1 for effecting a remote control operation, and further, as best seen in FIG. 2, may be directly connected to a handle shaft 15 so that manual operation can be effected. Such converting mechanism 13, besides carrying out said reduction operation, is also adapted to carry out locking operation positively to hold a valve in locking position after "ON" and "OFF" operation of a valve by means of rotational driving force of the handle shaft 15 or the connecting rod 12.

FIG. 3 is an enlarged sectional view of said converting mechanism 13, in which a yoke 16 for the control mechanism is fixedly secured to a valve main body 17. Further, a pair of vertical slide guide portions 18 comprising vertical recess provided at the inside surface of said yoke 16 are provided on the opposite sides of the yoke 16 respectively. Into the central portion of said yoke 16, the connecting rod 12 and the handle shaft 15 are inserted to a desired depth or length and the portion inserted into the yoke has externally threaded screws 19 so that such threaded rod may not be allowed to move upwardly or downwardly at a fixed position unless it is rotationally driven. An internally threaded bush 21 provided with pins 20 integral thereof is engaged with the externally threaded portion of the rod and the pin portions thereof are permitted to freely slide within the said guide portions 18. Therefore, when the externally threaded rod 19 is rotated by means of the handle 11 or the like, the internally threaded bush is caused to slide upwardly or downwardly along the concave recess with the pin portions thereof being kept within the recessed guides 18. To the pin portions of the internally threaded bush 21 is loosely fitted a rotor 23, as shown in FIG. 5, provided with a guide slot 22 whose contour may be made in a suitable form or shape. The section of the rotor 23 is U-shaped and at the inner bottom of the rotor 23 a lift adjusting ring 24 is screwed. Therefore, when the internally threaded bush 21 and the pins 20 thereof are caused to move upwardly and downwardly, the rotor 23 into which said pins are loosely fitted is rotatably moved along the guide slots 22 and at the same time a valve body (not shown) which is coupled to the valve stem 14 is caused to be opened, throttled or closed by the rotational movement of the rotor. In this instance, if the guide slots 22 are shaped as illustrated in FIG. 6(A), the rotation of the valve stem 14, that is the ON and OFF locus of the valve body is indicated by the curve shown in FIG. 6(B). On the other hand, when the guide slots are shaped as illustrated in FIG. 6(C), then the rotational angle of the valve body becomes small at the portions very close to its starting and stopping and is larger in the intermediate course. That is, by varying the contour or shape of the guide slots 22, it will become possible to make linear or parabola the relation between the rotational angle of the valve body to the rotational locus of the valve body. Further it is also possible to make a fine adjustment of said relationship. With the above arrangement, the present invention now can provide a better control system which can be adjusted to the most suitable characteristic according to a required condition.

The reference number 25 designates a stop ring for controlling a lift limit of the rotor 23. Further, the screwed position of the lift control ring 24 provided at the inner bottom portion of the rotor 23 can be varied so that the contact distance between the lower surface of the internally threaded bush 21 and the upper surface of the ring 24 can be slightly changed, whereby the distance of the vertical movement of the internally threaded bush 21 can be freely adjusted. In other words, since the rotation of the rotor 23 can be adjusted, the valve stem 14 which is connected to the rotor 23 can be optionally adjusted so that any error occurring between the valve body and the valve seat when being installed can be entirely corrected. In the figure the reference number 26 designates a set screw for holding the lift adjustment ring 24 in position while the number 27 designates a packing.

FIG. 7 illustrates the case where the valve stem 15 is mechanically rotated. In this case, the driving force of a motor 28 can be transmitted by engaging the reduction gear 29 secured to the main driving shaft of the driving motor 28 with a gear 30 securely fixed at the upper end of the valve stem 15. In another embodiment of this invention which is illustrated in FIG. 8, the internally threaded bush 21 provided with its integral pin portions 20 is directly secured to the inner end of the valve stem 15 and the vertical sliding movement thereof may be utilized for controlling the valves.

In this case, the upper end of the valve stem 15 is fixedly secured to a piston 33 provided in an inner chamber 32 of a cylinder 31 and when a suitable medium under pressure is supplied through a feeding port 34 which is communicated with a pressure supply source, the piston 33 is caused to move downward and when a medium under pressure is supplied from the supplying port 35, the piston 33 is caused to move upwardly. Therefore, the internally threaded bush 21 which is connected to the valve stem 15 will operate in the same manner as described above so that the rotor 23 can be driven in the same manner as described above.

As hereinbefore described, according to the present invention, the mechanism in which the rotation of the rotary shaft can be converted into a vertical linear movement which is further converted into a reduced rotary movement is provided in a compact manner on the axial line of the valve stem so that the valve control mechanism and the screw locking device thereof can be provided on the valve side. With the above arrangement, even when a remote control operation is desired, it is sufficient only to provide a handle mechanism at an operating device so that torsion of the connecting rod caused during operation can be compensated by the rotation of the handle after stopping the valve in position and further there will be no leakage at the handle portion.

It should be noted here that the device according to the present invention can be made of a piston actuation type by providing an oil-motor actuating method of fixing a deformed internally threaded bush to a piston rod, instead of a manual operation method by means of a rotational driving of the handle.

I claim:

1. In a valve such as a butterfly valve in which "ON-OFF" control of the valve can be effected by a rotational movement, a valve "ON-OFF" control device characterized in that a rotor to which a main valve stem is coupled is disposed within a yoke provided at an intermediate portion of a rotary movement actuating stem and the valve main stem; pin portions of an internally threaded bush which is threaded with the rotary movement actuating stem are fitted into guide slots provided at the side wall of the rotor; and the ends of said pins are fitted into longitudinal guide slots provided at the inner wall of the yoke; and the rotor is caused to rotate in one direction when the internally threaded bush slides upwardly and downwardly and wherein a lift adjusting ring for limiting the lower position is provided at the inner bottom portion of the rotor which is coupled to the internally threaded bush.

2. In a valve such as a butterfly valve in which "ON-OFF" control of the valve can be effected by a rotational movement, a valve "ON-OFF" control device according to claim 1, wherein a stop ring for limiting the upward lift of the internally threaded bush is provided at the outer periphery the upper opening of the rotor which is coupled with the internally threaded bush.

References Cited

UNITED STATES PATENTS

| | | | |
|---|---|---|---|
| 1,705,481 | 3/1929 | Karnath | 74—99 |
| 2,373,268 | 4/1945 | Shelly | 251—229 |
| 2,998,805 | 9/1961 | Usab | 74—89.15 X |
| 3,184,214 | 5/1965 | King | 251—270 X |
| 3,207,468 | 9/1965 | Lauducci et al. | 74—89.15 X |

WILLIAM F. O'DEA, *Primary Examiner.*

DAVID R. MATTHEWS, *Assistant Examiner.*